US010017952B2

(12) United States Patent
Grossman et al.

(10) Patent No.: US 10,017,952 B2
(45) Date of Patent: Jul. 10, 2018

(54) GRANULAR MATERIAL STORAGE CONTAINER AND ASSOCIATED METHOD

(71) Applicant: CTB, Inc., Milford, IN (US)

(72) Inventors: Rodney B Grossman, Goshen, IN (US); Justin M Holmes, Valparaiso, IN (US)

(73) Assignee: CTB, Inc., IN (US)

( * ) Notice: Subject to any disclaimer, the term of this patent is extended or adjusted under 35 U.S.C. 154(b) by 653 days.

(21) Appl. No.: 13/750,104

(22) Filed: Jan. 25, 2013

(65) Prior Publication Data

US 2014/0000189 A1    Jan. 2, 2014

Related U.S. Application Data

(63) Continuation of application No. 10/981,413, filed on Nov. 4, 2004, now abandoned.

(60) Provisional application No. 60/563,766, filed on Apr. 20, 2004.

(51) Int. Cl.
| | | |
|---|---|---|
| *E04H 7/22* | (2006.01) | |
| *B65D 88/08* | (2006.01) | |
| *B65D 88/68* | (2006.01) | |
| *B65D 90/02* | (2006.01) | |
| *E04H 7/30* | (2006.01) | |

(52) U.S. Cl.
CPC .............. *E04H 7/22* (2013.01); *B65D 88/08* (2013.01); *B65D 88/68* (2013.01); *B65D 90/024* (2013.01); *E04H 7/30* (2013.01)

(58) Field of Classification Search
USPC ................. 52/192, 293.3, 241, 242, 247
See application file for complete search history.

(56) References Cited

U.S. PATENT DOCUMENTS

| | | | | |
|---|---|---|---|---|
| 3,055,460 A | * | 9/1962 | Maroney ..................... 52/293.3 |
| 3,633,327 A | * | 1/1972 | Klingensmith et al. ........ 52/300 |
| 3,917,104 A | * | 11/1975 | Rossitto et al. ............. 220/565 |
| 4,287,691 A | * | 9/1981 | Guenther ..................... 52/97 |
| 5,009,052 A | * | 4/1991 | Welch ....................... 52/745.01 |
| 6,145,260 A | * | 11/2000 | Morton ....................... 52/293.2 |
| 2005/0072107 A1 | * | 4/2005 | Kebeli ........................ 52/720.1 |

FOREIGN PATENT DOCUMENTS

| | | |
|---|---|---|
| AU | 21576/67 | 11/1969 |
| FR | 2263173 | 10/1975 |
| GB | 2087467 | 5/1982 |

OTHER PUBLICATIONS

European Office Action issued for corresponding EP Patent Application No. 05736430.9 dated Nov. 5, 2010.
Supplemental European Search Report dated Jan. 22, 2010.
(Continued)

*Primary Examiner* — Jessica L Laux
(74) *Attorney, Agent, or Firm* — Harness Dickey (57) ABSTRACT

A granular material storage container and associated method. The storage container includes a foundation, a peripheral wall supported on the foundation, a plurality of vertical stiffeners attached to the peripheral wall, and a horizontal connector connecting the peripheral wall to the foundation. The horizontal connector extends between at least a pair of vertical stiffeners and operates for load transfer from the peripheral wall to the foundation during single pass sweeping.

23 Claims, 6 Drawing Sheets

(56) References Cited

OTHER PUBLICATIONS

Mexican Examiner's Report dated Mar. 17, 2009.
International Search Report and Written Opinion (in English) for PCT/US2005/013161 dated Sep. 20, 2006.
Decision on Appeal dated Nov. 26, 2012 from U.S.P.T.O. for parent U.S. Appl. No. 10/981,413.

* cited by examiner

GRANULAR MATERIAL STORAGE CONTAINER AND ASSOCIATED METHOD

CROSS-REFERENCE TO RELATED APPLICATIONS

This application is a continuation of U.S. Application No. 10/981,413, filed on Nov. 4, 2004, which claims the benefit of U.S. Provisional Application No. 60/563,766, filed on Apr. 20, 2004. The disclosure of the above application is incorporated herein by reference.

INTRODUCTION

Figure 1:
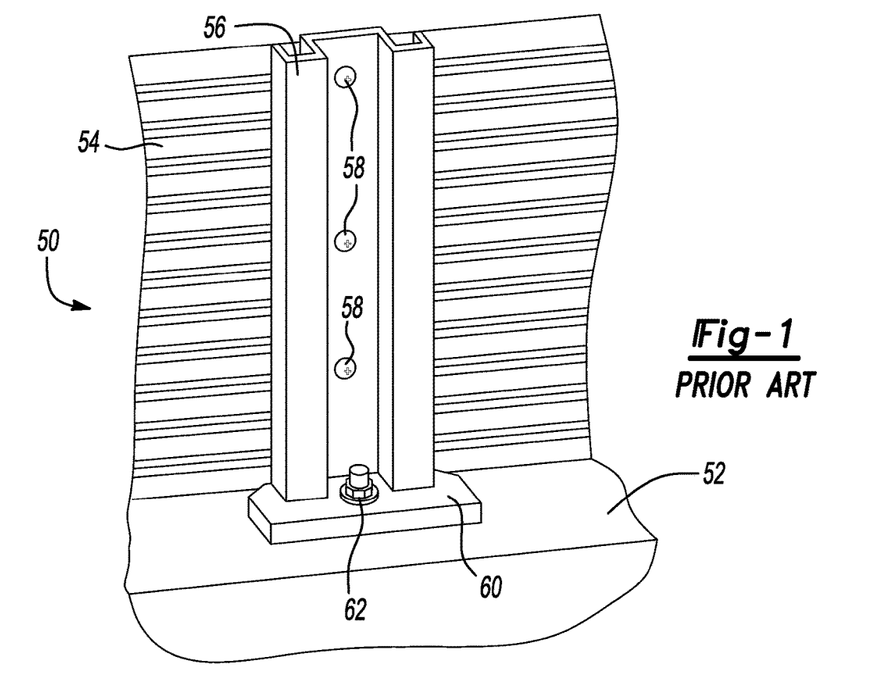
FIG. 1 is a perspective view of a portion of a prior art grain bin.
Figure 2:
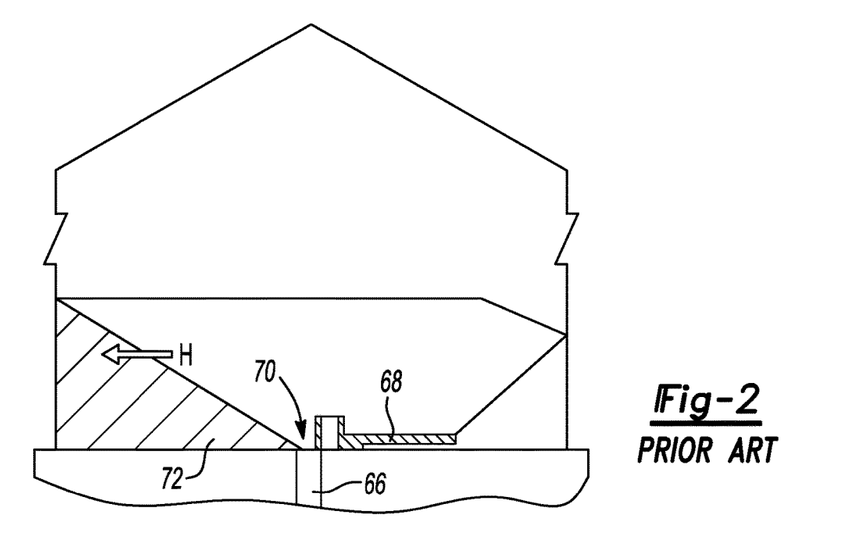
FIG. 2 is a side view of a prior art grain bin illustrating bin sweeping.

Storage containers for bulk granular material, such as grain bins, are subjected to considerable loads in a variety of directions and combinations. These loads include environmental loads, such as snow, wind and seismic loads, the weight of the granular material stored in the container, the weight of the container, and the weight of supported structures, such as conveyors, walkways, etc. The loads on a prior art grain bin 50, a portion of which is illustrated in FIG. 1, are transferred to the foundation 52, which supports the grain bin 50, through the roof (not shown), the peripheral wall 54 and the vertical stiffeners 56 of the grain bin 50. Therefore, adequate anchorage of the grain bin 50 to the foundation 52 is essential to prevent displacement of the grain bin 50. Historically, anchorage is provided by the vertical stiffeners 56 along the periphery of the grain bin 50. The vertical stiffeners 56 are bolted along their length to the peripheral wall 54 of the grain bin 50 with horizontal bolts 58, and also to the foundation 52 with a horizontal plate 60, which extends from each vertical stiffener 56. The horizontal plate 60 is bolted to the foundation 52 with vertical anchor bolts 62 which are sized to transmit shear (horizontal) and tension (vertical uplift) loads. Conventional grain bins may also include angle irons or standard roll-formed base flanges that extend from the peripheral wall to provide moisture protection or backing for a sealant against moisture.

Referring to prior art grain bins 50 in FIGS. 2, 3A, 3B and 3C, in addition to the loads described above, large prior art grain bins 50 (i.e., grain bins having a diameter larger than about 70 feet) can, in particular, be subjected to substantial horizontal loads that are generated during bin sweeping. After the grain bin 50 is emptied via gravity through a well or sump 66 in the center 70 of the foundation 52, a grain pile 64 remains in the grain bin 50 and must be swept into the well 66. The remaining grain pile 64 defines an inverted cone shape determined by an angle of repose β, which has a value characteristic of the particular granular material. Typical angles of repose for grains are about 27°-30°.

Figure 3A:
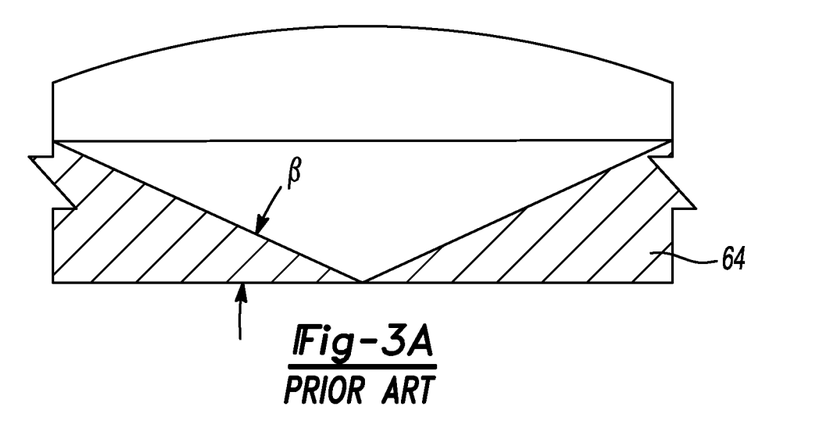
FIG. 3A is a side view of the prior art grain bin showing a grain pile before a first pass of a double pass sweep.
Figure 3B:
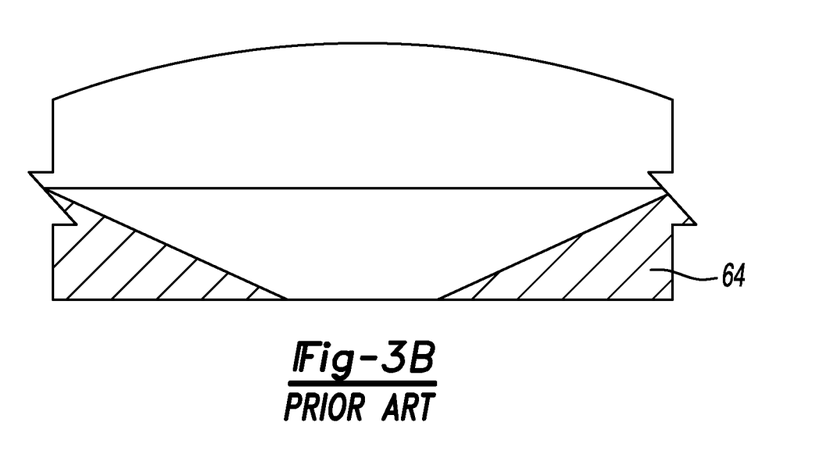
FIG. 3B is a side view of the prior art grain bin of FIG. 3A showing the grain pile after the first pass of the double pass sweep.
Figure 3C:
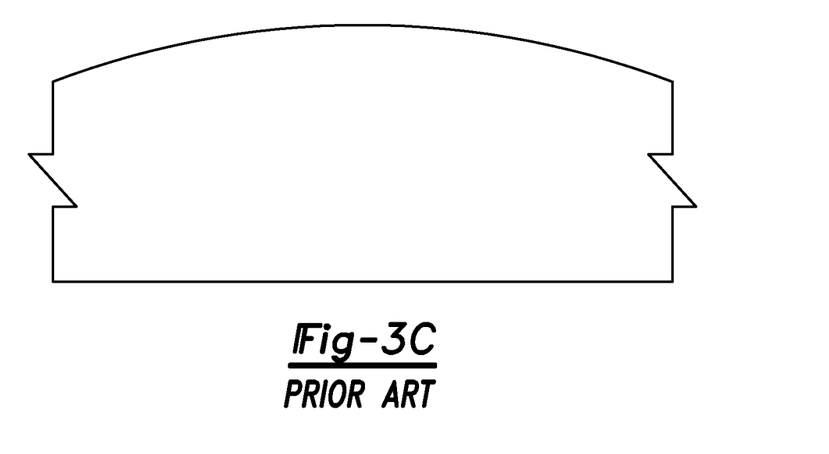
FIG. 3C is a side view of the prior art grain bin of FIG. 3A after a second pass of the double pass sweep.

Bin sweeping is conventionally done with a horizontal auger 68 pinned at the center 70 of the foundation 52 and slowly rotating around the grain bin 50. The auger 68 draws grain from the grain pile 64 toward the center 70 and down the well 66. As the auger 68 travels, eliminating the grain pile 64, the auger 68 creates an asymmetrical pile of grain 72 with a resultant horizontal force H, which is at a maximum when the grain bin 50 is about half-swept. To reduce horizontal loads generated during bin sweeping and the effect of such loads on large diameter grain bin structures, augers 68 with sectional/extendable lengths have been used, such that the emptying of the grain bin 50 can be completed in two or more passes of the auger 68, thereby reducing the magnitude of the horizontal force H. For a double pass sweep, FIGS. 3A, 3B and 3C illustrate respectively the grain pile 64 before the first pass sweep, after the first pass sweep, and after the second pass sweep.

Attempts to accommodate the horizontal loads by increasing the number and size of anchor bolts 62 can still result in shear failures of the anchor bolts 62 under shear loads produced by single pass sweeping, especially in grain bins of a diameter greater than about 72 feet. Failure of the anchor bolts 62 progresses to the horizontal bolts 58 along the length of the vertical stiffeners 56 causing "unzipping" of vertical stiffeners 56 from the base plate 60 upwards, and/or causes extensive damage Although double or multiple pass augers 68 have been used to reduce the magnitude of the horizontal force, their use requires bin entry by operators between passes to extend the length of the auger 68. There is, therefore, a need for improved and cost efficient large grain bins that reduce or eliminate the need for bin entry during bin sweeping, and thus, improve safety during grain unloading.

SUMMARY

The present teachings provide a granular material storage container that includes a foundation, a peripheral wall supported on the foundation, a plurality of vertical stiffeners attached to the peripheral wall, and a horizontal connector connecting the peripheral wall to the foundation. The horizontal connector extends between at least a pair of vertical stiffeners and operates for load transfer from the peripheral wall to the foundation during single pass sweeping.

The present teachings also provide a method of adapting a granular material storage container for single pass sweep. The method includes providing the storage container with a primary support structure structurally sufficient for forces generated by multiple pass sweeping, but structurally insufficient for forces generated by single pass sweeping, and providing the storage container with a secondary support structure, which, in combination with the primary support structure, is structurally sufficient for forces generated by single pass sweeping.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description is merely exemplary in nature and is in no way intended to limit the invention, its application, or uses. For example, although a grain bin is illustratively described, the present teachings are not limited to grain bins, but can be used for any storage containers of bulk granular material.

Figure 4:
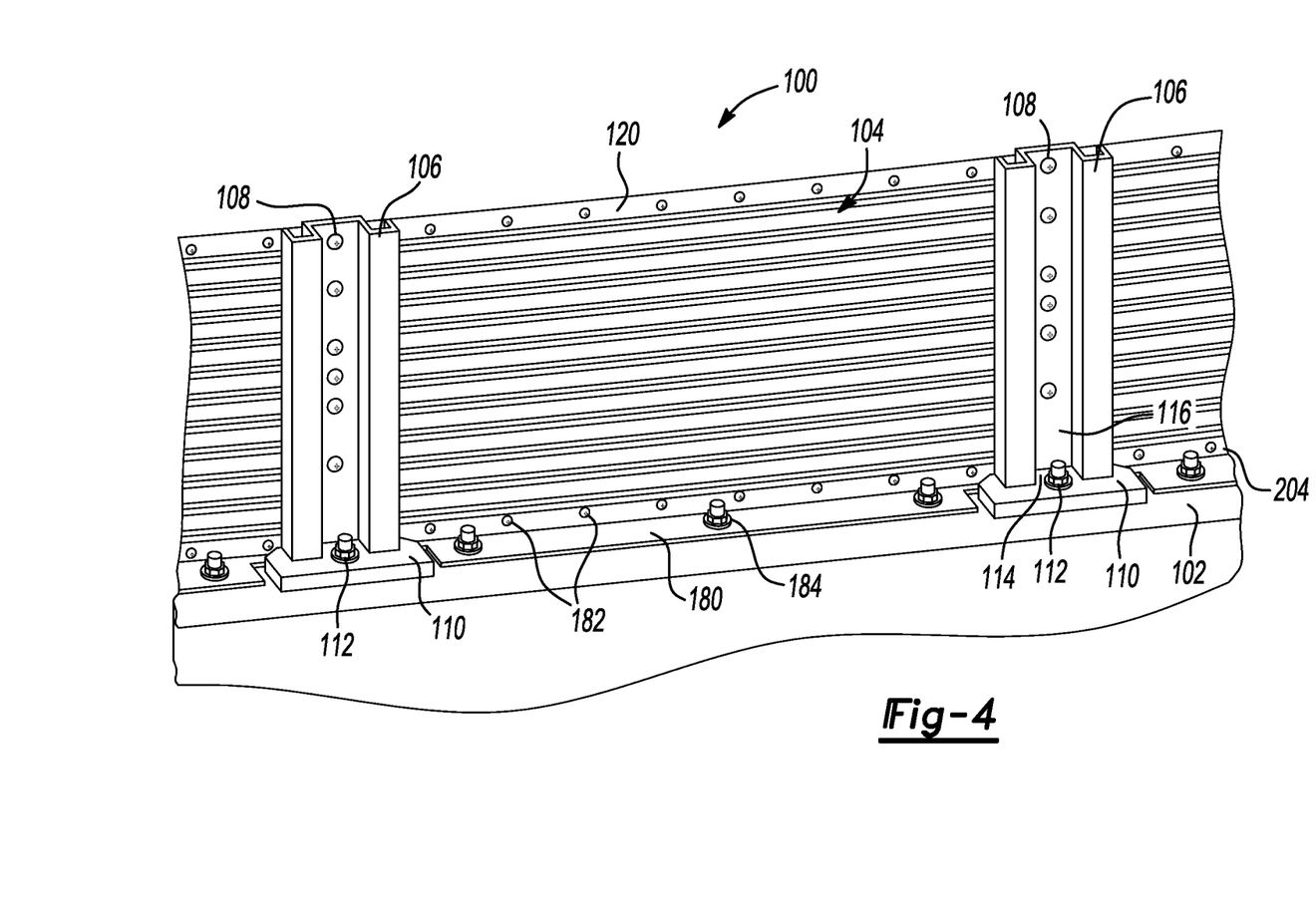
FIG. 4 is a partial perspective view of a granular material storage container according to the present teachings.

Referring to FIG. 4, an exemplary granular material storage container 100 according to the present teachings, illustrated as a grain bin, includes a foundation 102, a peripheral wall 104 and a plurality of vertical stiffeners 106. The peripheral wall 104 can be constructed of sidewall sheets, which can be conventionally made of corrugated galvanized steel or other structural material. One or more sheets can be laminated together to provide greater strength for tall grain bins 100. In one aspect, the foundation 102 can be made of concrete or other suitable materials. The vertical stiffeners 106 are attached to the peripheral wall 104 along their entire length with a series of spaced horizontal bolts 108. The vertical stiffeners 106 can be made, for example, of galvanized steel or other suitable structural materials, and can have a cross-sectional profile selected for a desired load carrying capacity. Available profiles with various load carrying capacities, include, for example, Z-type, channel type, hat type, and Brock® type. The vertical stiffeners 106 can be installed outside the grain bin 100, on the outer side 120 of the grain bin 100, as illustrated in FIG. 4. Each vertical stiffener 106 is attached to the foundation 102 with a horizontal base plate 110, which can be integral to the vertical stiffener 106 or can be part of a bracket 114 which is attached to the base portion 116 of the vertical stiffener 106. An anchor bolt 112 attaches the base plate 110 to the foundation 102.

Referring to FIGS. 1-8, the grain bin 100 includes a horizontal connector 180 that extends between at least two vertical stiffeners 106 and connects the peripheral wall 104 to the foundation 102. The horizontal connector 180 can be made of galvanized structural steel or other appropriate structural material. The horizontal connector 180 is a structural support member with a load-carrying capacity that functions as a horizontal stiffener and horizontal load transfer member. The horizontal connector 180 is attached to the peripheral wall 104 with a plurality of wall bolts or similar wall fasteners 182, and to the foundation 102 with a plurality of base fasteners 184.

Figure 5:
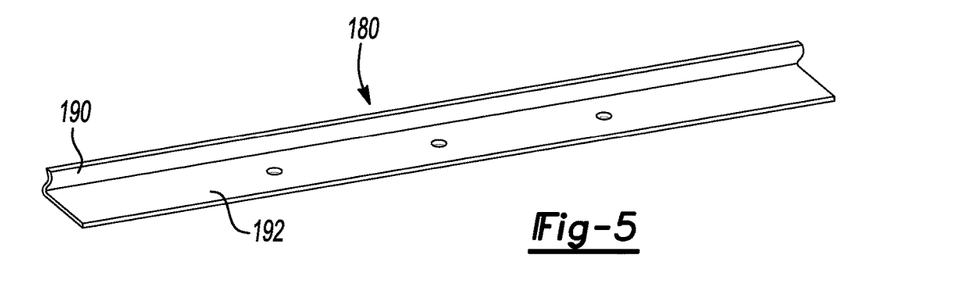
FIG. 5 is a perspective view of a horizontal connector according to the present teachings.
Figure 6:
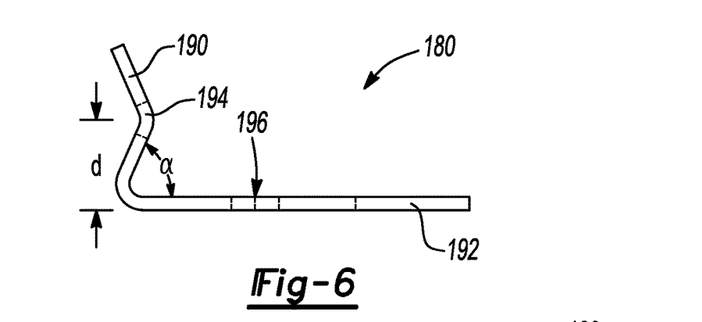
FIG. 6 is cross-sectional view of the horizontal connector of FIG. 5.

Referring to FIGS. 4, 5 and 6, the horizontal connector 180 includes a web 190 for attachment to the peripheral wall 104 of the grain bin 100, and a flange 192 for attachment to the foundation 102. The web 190 and the flange 192 define an angle a which can be selected such that the web 190 conforms or mates with the profile of the peripheral wall 104, which can have a corrugated shape. The web 190 can include a plurality of pre-drilled holes 194 for receiving the wall fasteners 182. Similarly, the flange 192 can include a plurality of pre-drilled holes 196 for receiving the base fasteners 184. As seen in FIG. 4, both the web 190 and the flange 192 are attached on the outer side 120 of the peripheral wall 104.

The horizontal connectors 180 of the grain bin 100 of the present teachings provide additional load transfer paths first through the wall fasteners 182 and then through the base fasteners 184, thereby reducing the load transferred through the horizontal bolts 108 and the anchor bolts 112 that attach the vertical stiffeners 106 to the foundation 102.

In alternative embodiments, the horizontal connectors 180 can be attached to the grain bin 100 such that the peripheral wall 104 rests on the flange 192, while the flange 192 remains outside the grain bin 100 and the web 190 remains inside the grain bin 100, or conversely. Such attachment is also possible for retrofitting an existing multiple pass sweep grain bin 50, because the peripheral wall 54 can be locally lifted to insert the horizontal connectors 180 under the peripheral wall 54, with the web 190 and the flange 192 on opposite sides of the peripheral wall 54.

Figure 7:
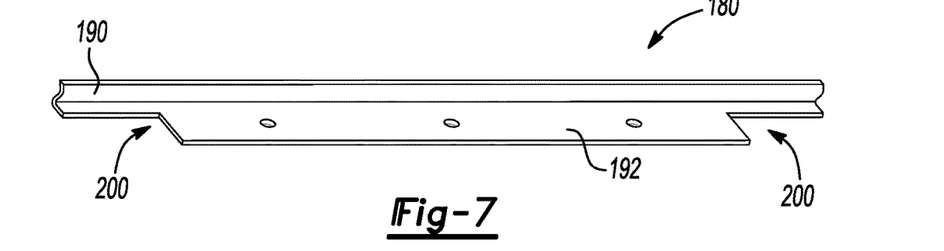
FIG. 7 is a perspective view of a horizontal connector according to the present teachings.
Figure 8:
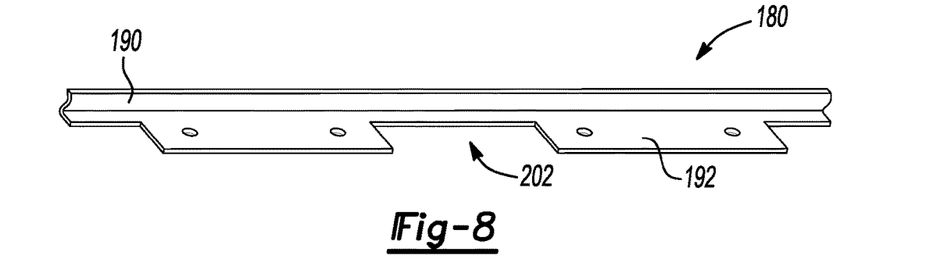
FIG. 8 is a perspective view of a horizontal connector according to the present teachings.

Referring to FIGS. 7 and 8, the horizontal connector 180 can have end cutouts 200 to accommodate the base plates 110 of two vertical stiffeners 106. The horizontal connector 180 can also be sized to extend over a distance spanned by three vertical connectors 106, by including an intermediate cutout 202. It will be appreciated that the horizontal connectors 180 can be placed end to end to cover the entire periphery 204 of the grain bin 100. It will be appreciated, however, that the horizontal connectors 180 can also be placed selectively between selected vertical stiffeners in locations where the horizontal loads are anticipated to be consistently high, such as about locations where the start and end points of the sweep motion can be made to occur.

Figure 9:
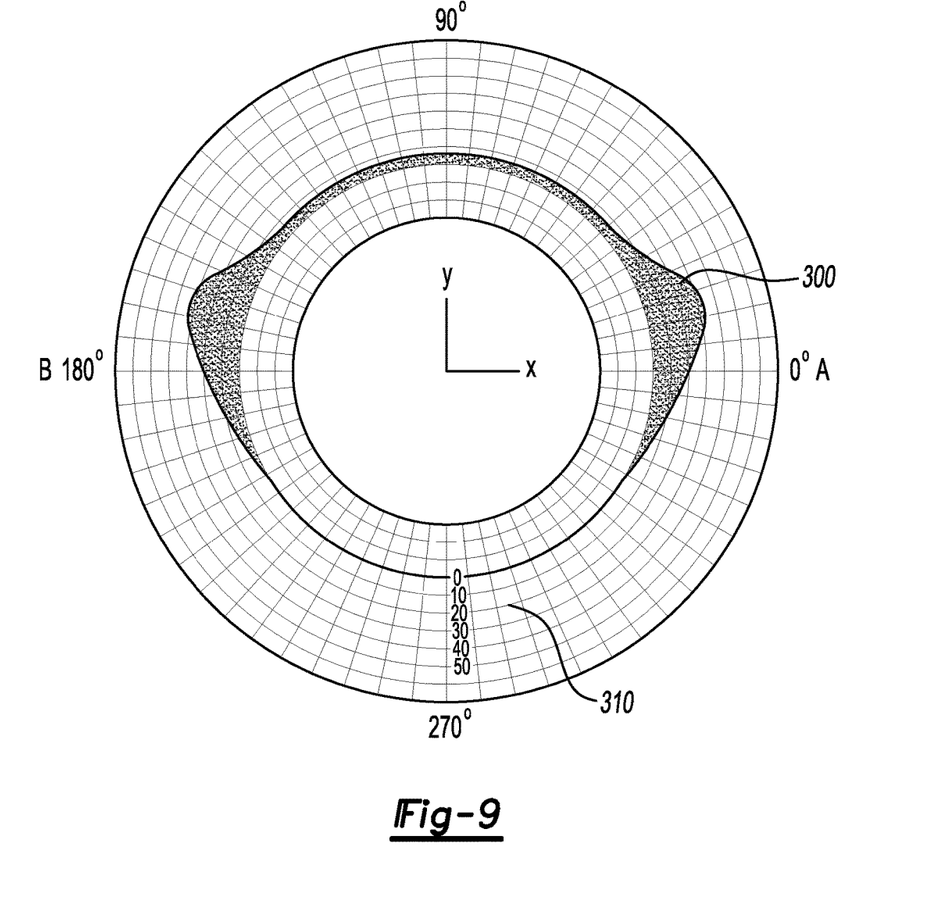
FIG. 9 is an exemplary diagram illustrating shear loads generated after one half of a grain bin is swept by single pass sweeping.
Figure 10A:
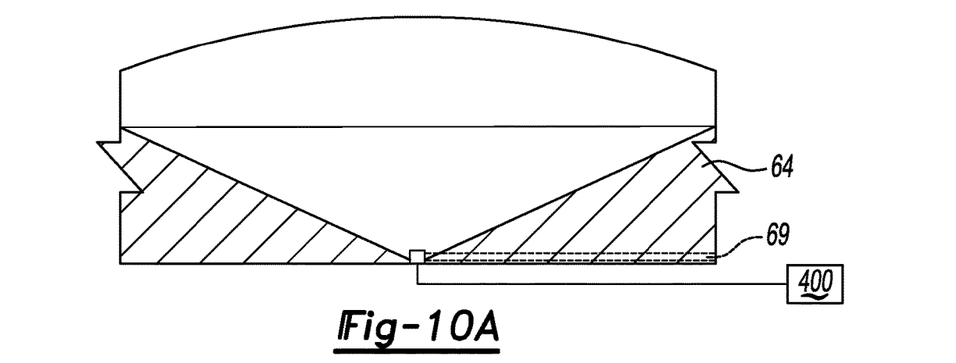
FIG. 10A is a side view of a grain bin showing a grain pile before a pass of a single pass sweep according to the present teachings.
Figure 10B:
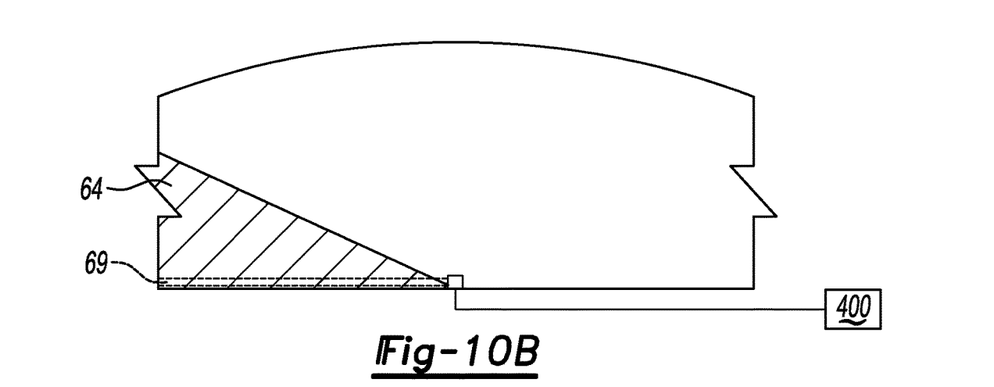
FIG. 10B is a side view of the grain bin of FIG. 10A, after one half of the grain bin is swept by one-half of a single pass sweep.
Figure 10C:
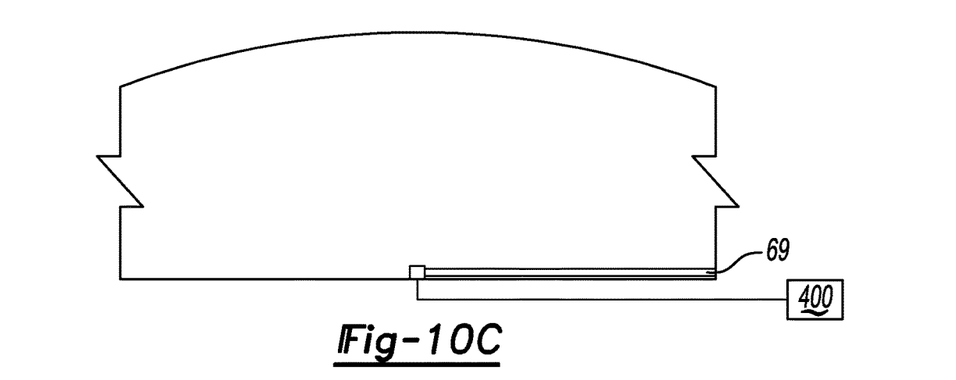
FIG. 10C is a side view of the grain bin of FIG. 10B, after a complete single pass sweep.

Referring to FIG. 9 and FIGS. 10, shear loads generated by the grain load when half the grain bin is swept by a single pass sweep of a single pass auger 69 are represented by a solid line 300. In this example, a grain bin of a diameter of 90 feet is modeled for computational purposes using the software package RISA-3D (Version 4.5) available from RISA Technologies, Lake Forest, Calif. The concentric circles 310 represent the magnitude of shear loads in uniform increments. Sweeping starts at angle 0° indicated by position "A" and proceeds in the clockwise direction. At angle 180° indicated by position "B", half of the grain bin is swept, and the grain pile is concentrated in the area between 0° and 180° (upper area of the diagram of FIG. 9, and FIG. 10B). The maximum shear loads in the direction indicated by axis "Y" develop symmetrically at about 15° and 165°, or 15° away from the start position A and the half-way position B of sweeping toward the grain pile.

In the example of FIG. 9, one or more horizontal connectors 180 could be placed selectively between the vertical stiffeners 106 that are positioned between 150°-200° and symmetrically opposite locations. Such selective positioning of horizontal connectors can be used in combination with a manual or automated/programmable controller 400 can be placed outside the grain bin 100 and connected to the single pass auger 69. The controller 400 can be operated to control various aspects of the motion of the single pass auger 69, including insuring a specific location of the auger 69 when single pass sweeping starts, such as the start position A of FIG. 9.

The horizontal connectors 180 can be conveniently attached outside the grain bin 100. The horizontal connectors 180 define a secondary structure that can be attached to an existing grain bin 50, which has a primary structure defined by vertical stiffeners 56 that is structurally sufficient for forces generated during double or multiple pass sweep, but is not structurally sufficient for forces generated during single pass sweep. By adding the horizontal connectors 180 to the primary structure of the grain bin 50, the grain bin 50 can be adapted for single pass sweep. In the present context, a structure is "structurally sufficient" for a force or load when the structure can withstand repeated application of the load during normal use without failure or other undesirable deformation/fracture during the structure's conventional life expectancy.

For very large diameter grain bins, such as grain bins of a diameter greater than about 100 feet, additional reduction of horizontal force loads carried by the anchor bolts 112 during bin sweeping can be achieved by increasing the dimensions of the horizontal connector 180 and, in particular, the distance "d" of the wall bolt 194 on the web 190 from the flange 192 to reduce the length of load path of the horizontal forces through the wall fasteners 182 and base fasteners 184, and/or by increasing the number of wall fasteners 182 and base fasteners 184 per unit length of the horizontal connector 180.

The horizontal connector 180 can be easily manufactured from a flat pattern that can be roll-formed to define the web 190 at an angle to the flange 192, or by any other known method, and can be sized for use with newly-constructed granular storage containers/grain bins 100 of different sizes and with existing grain bins 50. Therefore, any size grain bin can be used for a single pass sweep, as taught herein. Furthermore, the present teachings provide a cost-efficient single pass sweep grain bin 100, which improves safety by eliminating the need for bin entry during unloading, and which provides greater resistance to seismic loads, allowing taller grain bins to be used in zones of high seismic activity.

Various methods associated with the use of the disclosed horizontal connectors 180 are apparent from the discussion herein. More specifically, the present teachings provide a method for adapting a grain bin for single pass sweep, such as converting the prior art grain bin 50 to the grain bin 100 of the present teachings. The method includes providing a grain bin 50 that has a primary support structure of vertical stiffeners 56 that is structurally sufficient for forces generated by multiple pass sweeping, but structurally insufficient for forces generated by single pass sweeping. The method includes adding a secondary support structure of substantially horizontal connectors 180 and their attachments, which, in combination with the primary support structure of the prior art grain bin 50, is structurally sufficient for forces generated by single pass sweeping. The horizontal connectors 180 can be attached to the outside of an existing peripheral wall 104. Alternatively, the grain bin 100 can be raised to attach the flange 190 onto the interior of the peripheral wall 104.

While particular embodiments have been described in the specification and illustrated in the drawings, it will be understood by those skilled in the art that various changes may be made and equivalents may be substituted for elements thereof without departing from the scope of the invention as defined in the claims. In addition, many modifications may be made to adapt a particular situation or material to the present teachings without departing from the essential scope thereof. Therefore, it is intended that the present teachings not be limited to the particular embodiments illustrated by the drawings and described in the specification, but that the present teachings will include any embodiments falling within the foregoing description and the appended claims.

What is claimed is:

1. A single pass sweeping granular material storage system comprising:
    a foundation having a surface at about ground level or above;
    a substantially circular peripheral wall having a diameter that is larger than about 70 feet, the peripheral wall being supported on the surface of the foundation and defining a plurality of horizontal corrugations;
    a plurality of base plates coupled to the foundation;
    a plurality of vertical stiffeners, each of the vertical stiffeners being coupled to the peripheral wall, and being coupled to the foundation via one of the plurality of base plates;
    a single pass radial sweep auger configured to remove granular material in a single pass and to generate a corresponding single-pass shear load force directed along the peripheral wall;
    at least one horizontal connector being coupled to the surface of the foundation and to the peripheral wall, wherein the horizontal connector has a size and configuration sufficient in combination with the vertical stiffeners to transfer the shear load forces from the peripheral wall to the foundation during single pass sweeping;
    wherein the plurality of vertical stiffeners are structurally sufficient for loads generated by multiple-pass radial sweeping, but not structurally sufficient for loads generated by single pass radial sweeping without the horizontal connector.

2. The system of claim 1, wherein the horizontal connector comprises a horizontal flange coupled to the surface of the foundation and disposed between base plates of a first and a second vertical stiffener of the plurality of vertical stiffeners, and a web having a first portion extending upwardly and in a first horizontal direction at a first angle from the horizontal flange to a second portion of the web extending at a second angle from the first portion upwardly and in a second horizontal direction that is opposite to the first horizontal direction and forming a longitudinally extending peak at an angular interface between the first portion and the second portion of the web.

3. The system of claim 2, wherein the horizontal connector is coupled to the wall via fasteners extending through apertures along the longitudinally extending peak of the web.

4. The system of claim 2, wherein the first angle is an acute angle between the horizontal flange and the first portion, and the second angle is an obtuse angle between the first portion and the second portion of the web.

5. The system of claim 1, wherein the plurality of horizontal corrugations extend to the foundation, and the horizontal connector comprises a longitudinally extending peak between a first portion and a second portion of a generally upwardly extending web of the horizontal connector, and wherein the longitudinally extending peak conforms to a corresponding peak of a lowermost one of the plurality of horizontal corrugations of the peripheral wall.

6. The system of claim 5, wherein the horizontal connector is coupled to the wall via fasteners extending through apertures along the longitudinally extending peak of the web.

7. The system of claim 1, wherein the web of the horizontal connector is disposed against an inner surface of the peripheral wall and the horizontal flange of the horizontal connector extends outside the peripheral wall and is exposed to the exterior of the storage system.

8. The system of claim 7, wherein the horizontal connector comprises a horizontal flange coupled to the surface of the foundation and disposed between base plates of a first and a second vertical stiffener of the plurality of vertical stiffeners, and wherein each end of the horizontal connector includes a cut-out in the flange allowing a fastener to couple an adjacent base plate to the foundation without extending through the horizontal flange.

9. The system of claim 1, wherein the diameter is larger than about 100 feet.

10. A single pass sweeping granular material storage system comprising:
an above ground granular material storage container comprising a substantially circular peripheral wall having a diameter that is larger than about 70 feet;
a single pass radial sweep auger configured to remove granular material in a single pass and to generate a corresponding single-pass shear load force directed along the peripheral wall; and
a primary support structure comprising a plurality of vertical stiffeners coupled to a foundation and to the peripheral wall, wherein the primary support structure is structurally sufficient for forces generated by multiple pass sweeping, but structurally insufficient for load transfer of shear forces directed primarily along the substantially circular peripheral wall that are generated by single pass sweeping;
a secondary support structure at about ground level or above and comprising at least one horizontal connector including a web portion coupled to the peripheral wall and a flange portion coupled to the foundation and extending substantially completely between a first and a second adjacent vertical stiffener of the plurality of vertical stiffeners, wherein the secondary support structure has a size and configuration that in combination with the primary support structure is structurally sufficient to transfer forces generated by single pass sweeping from the peripheral wall to the foundation during single pass sweeping without damage to any of the peripheral wall, the primary support structure, and the secondary support structure.

11. The system of claim 10, wherein the horizontal connector comprises a horizontal flange coupled to the surface of the foundation and disposed between base plates of the first and the second adjacent vertical stiffeners of the plurality of vertical stiffeners, and a web having a first portion extending upwardly and in a first horizontal direction at a first angle from the horizontal flange to a second portion of the web extending at a second angle from the first portion upwardly and in a second horizontal direction that is opposite to the first horizontal direction and forming a longitudinally extending peak at an angular interface between the first portion and the second portion of the web.

12. The system of claim 11, wherein the horizontal connector is coupled to the wall via fasteners extending through apertures along the longitudinally extending peak of the web.

13. The system of claim 11, wherein the first angle is an acute angle between the horizontal flange and the first portion, and the second angle is an obtuse angle between the first portion and the second portion.

14. The system of claim 10, wherein the plurality of horizontal corrugations extend to the foundation, and the horizontal connector comprises a longitudinally extending peak between a first portion and a second portion of a generally upwardly extending web of the horizontal connector, and wherein the longitudinally extending peak conforms to a corresponding peak of a lowermost one of the plurality of horizontal corrugations.

15. The system of claim 14, wherein the horizontal connector is coupled to the wall via fasteners extending through apertures along the longitudinally extending peak of the web.

16. The system of claim 10, wherein the web of the horizontal connector is disposed against an inner surface of the peripheral wall and the horizontal flange of the horizontal connector extends outside the peripheral wall and is exposed to the exterior of the storage system.

17. The system of claim 16, wherein the horizontal connector comprises a horizontal flange coupled to the surface of the foundation and disposed between base plates of the first and the second adjacent vertical stiffeners of the plurality of vertical stiffeners, and wherein each end of the horizontal connector includes a cut-out in the flange allowing a fastener to couple an adjacent base plate to the foundation without extending through the horizontal flange.

18. The system of claim 10, wherein the diameter is larger than about 100 feet.

19. A single pass sweeping granular material storage system comprising:
a foundation for the granular material storage system having a surface at about ground level or above;
a substantially circular peripheral wall having a diameter of larger than about 70 feet, the peripheral wall being supported on the surface of the foundation and defining a plurality of horizontal corrugations;
a plurality of base plates coupled to the foundation;
a plurality of vertical stiffeners, each of the vertical stiffeners being coupled to the peripheral wall, and being coupled to the foundation via one of the plurality of base plates;
a single pass radial sweep auger configured to remove granular material in a single pass and to generate a corresponding single-pass shear load force directed along the peripheral wall;
at least one horizontal connector comprising:
a horizontal flange coupled to the surface of the foundation and disposed between base plates of a first and a second vertical stiffener of the plurality of vertical stiffeners;
a web having a first portion extending upwardly at an acute angle from the horizontal flange to a second portion of the web extending upwardly at an obtuse angle from the first portion and forming a longitudinally extending peak at an angular interface between the first and the second portion of the web; and
a plurality of apertures extending along the longitudinally extending peak at the angular interface between the first portion and the second portion of the web through which fasteners couple the horizontal connector to the peripheral wall;
wherein the at least one horizontal connector has a size that is structurally sufficient in combination with the plurality of vertical stiffeners to transfer forces generated by single pass sweeping from the peripheral wall to the foundation during single pass sweeping without damage to the granular material storage system.

20. The system of claim 19, wherein the plurality of horizontal corrugations of the peripheral wall extend to the foundation, and the longitudinally extending peak conforms to a corresponding peak of a lowermost one of the plurality of horizontal corrugations of the peripheral wall.

21. The system of claim 20, wherein the web of the horizontal connector is disposed against an inner surface of the peripheral wall and the horizontal flange of the horizontal connector extends outside the peripheral wall and is exposed to the exterior of the storage system.

22. The system of claim 21, wherein the horizontal connector comprises a horizontal flange coupled to the surface of the foundation and disposed between base plates of the first and the second vertical stiffener of the plurality of vertical stiffeners, and wherein each end of the horizontal connector includes a cut-out in the flange allowing a fastener to couple an adjacent base plate to the foundation without extending through the horizontal flange.

23. The system of claim 22, wherein the plurality of vertical stiffeners are structurally sufficient for loads generated by multiple-pass radial sweeping, but not structurally sufficient for loads generated by single pass radial sweeping without the horizontal connector.

* * * * *